Oct. 29, 1963   C. W. ZIES   3,108,530
APPARATUS FOR THE PREPARATION OF FOOD COMPOUNDS
Filed June 6, 1960   3 Sheets-Sheet 3
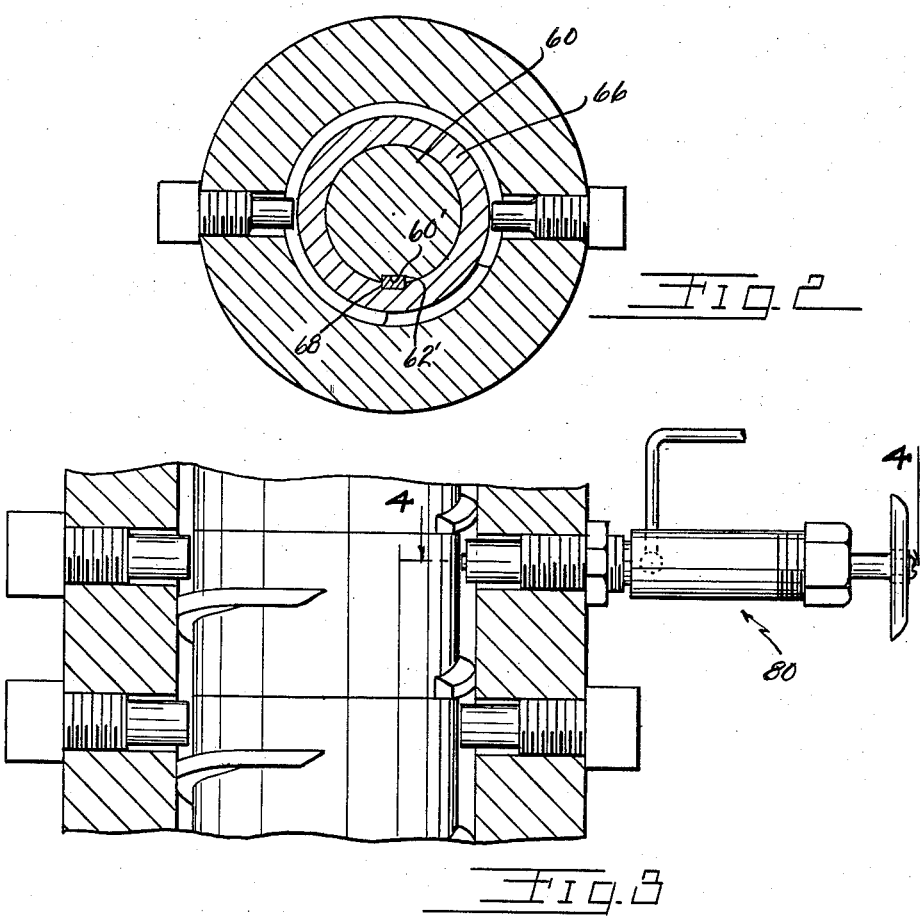
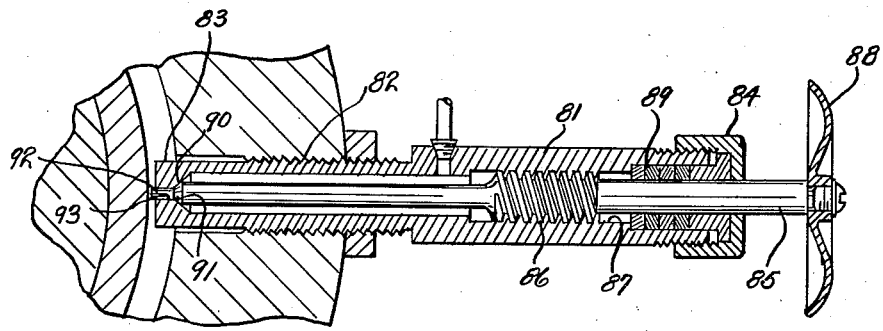
INVENTOR.
CARL W. ZIES
BY
Meyer, Baldwin, Doran & Young
ATTORNEYS 3,108,530
APPARATUS FOR THE PREPARATION
OF FOOD COMPOUNDS
Carl W. Zies, Lakewood, Ohio, assignor to International
Basic Economy Corporation, New York, N.Y., a corporation of New York
Filed June 6, 1960, Ser. No. 34,306
7 Claims. (Cl. 99—238)

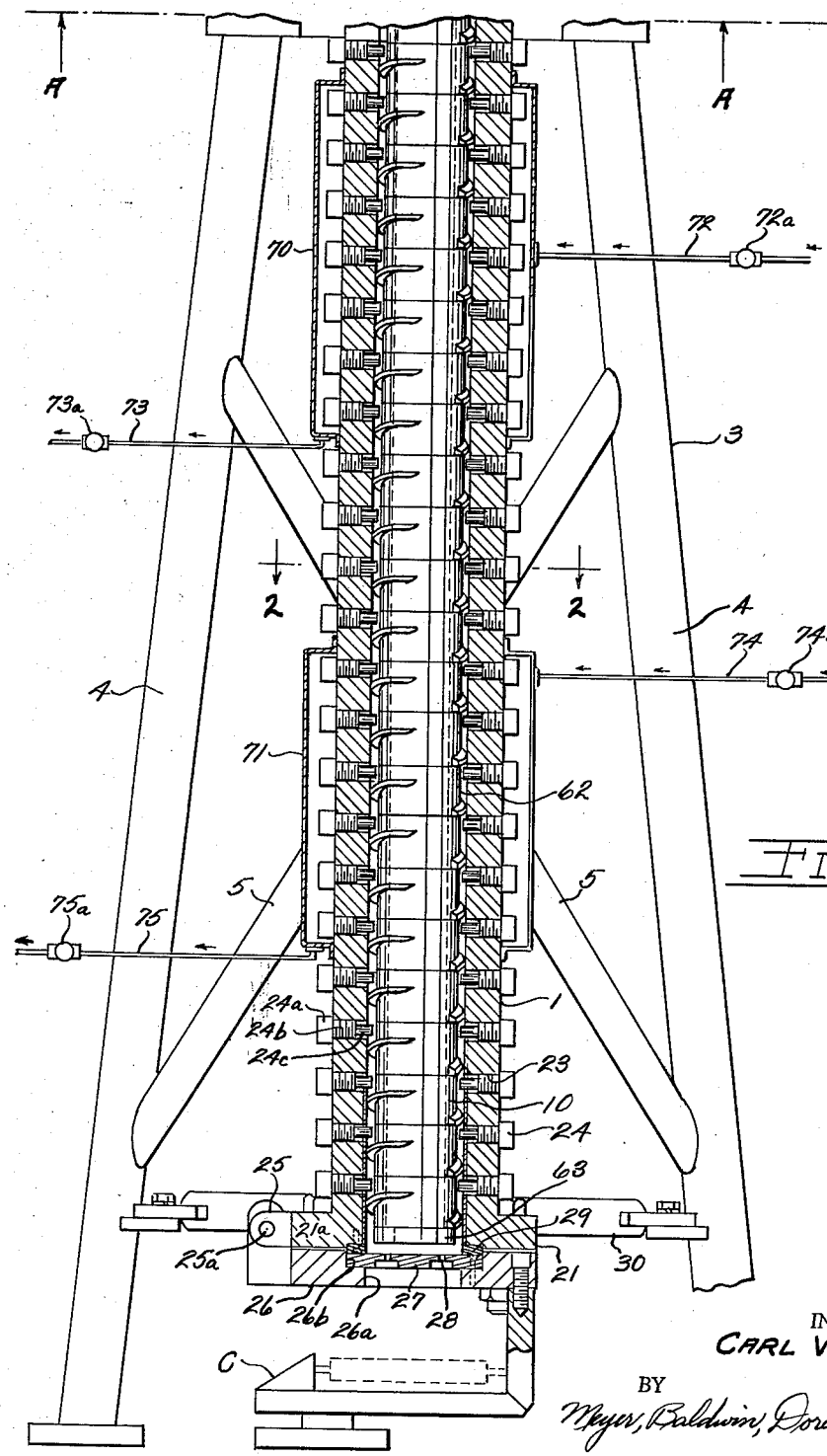

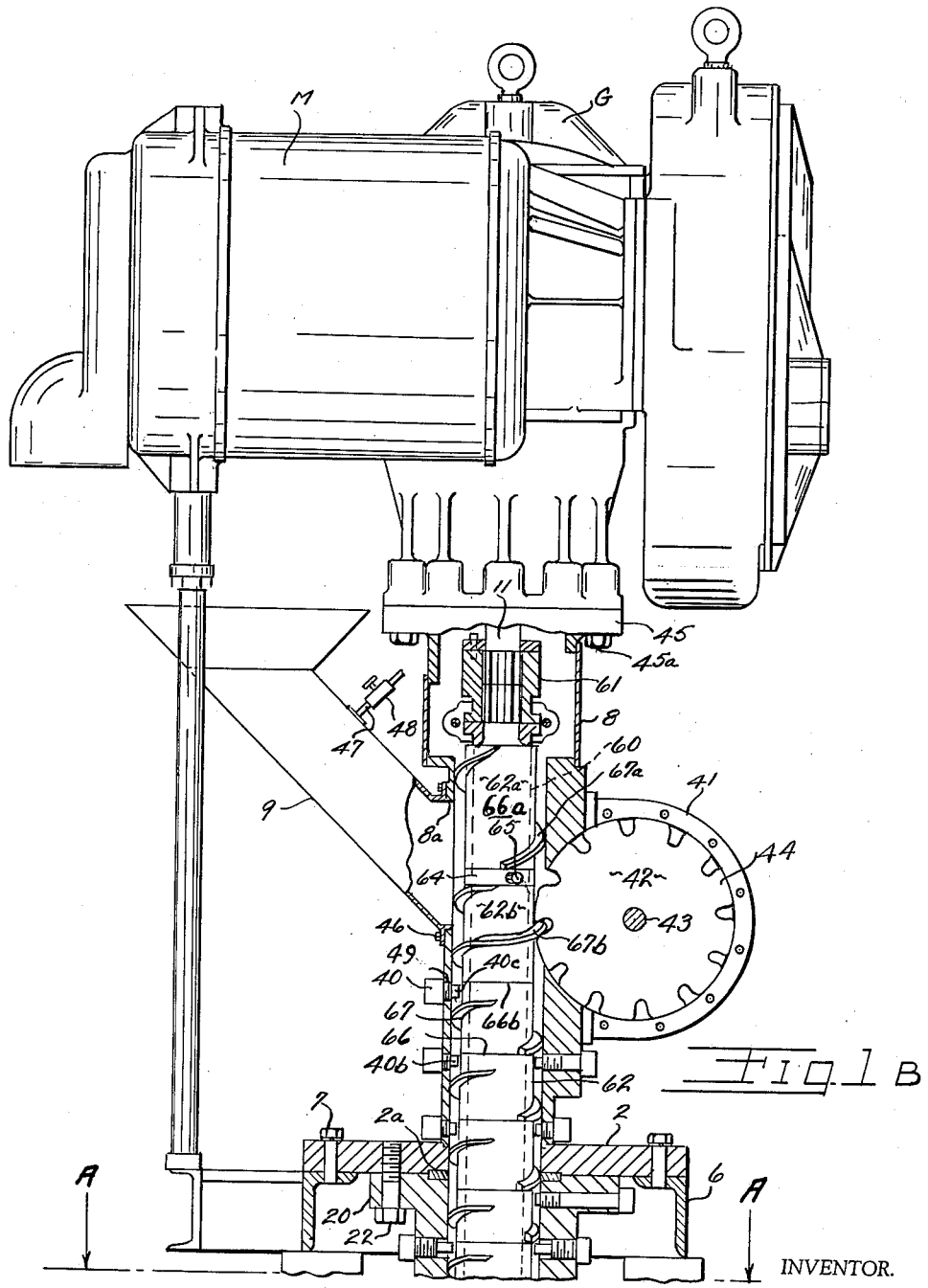

This invention relates to the preparation of food products for human and animal consumption and more particularly to apparatus for processing foods containing a high percentage of complex carbohydrates such as starch. Examples of the kinds of food referred to are various grains and the proteinaceous materials of both animal and vegetable origin.

It is well known that the enzymatic systems of some animals are not adapted to digest certain complex feeds. For example, the amylolytic enzyme system of a dog does not permit it to digest raw starches. Certain young animals, particularly prior to weaning, do not have complete enzymatic systems and it is impossible for these animals to digest certain native starches and proteins. It is, therefore, of value to cook feeds of the above type before they are fed to certain animals whereby a degree of starch hydrolysis is obtained. Also, experiments have shown that if the feed is prepared having a relatively low bulk density or a more open physical structure, it is much more readily digested.

Some foods such as soybeans and soybean meal contain an enzyme urease which is a deleterious component in mixed animal feeds. As is well known to those skilled in the art, soybean meal and soybeans are commonly "toasted" at a temperature of about 250° F. to deactivate the enzyme urease, and this results in a browning of the resulting product. Current development in the animal feed industry shows an increasing demand for a urease deactivated soybean product which shows no evidence of browning.

For the above reasons it is highly desirable that food products of the type referred to be cooked before being fed to certain animals in order to carry out the required degree of starch hydrolysis and, where necessary, deactivated harmful enzyme content without overtreating or browning of the primary components of the feed material. In precooking of feeds to accomplish the above results, the raw food materials are normally ground and processed in cylindrical vessels which are steam jacketed and contain some internal mechanical means of moving the material from a feed inlet or charging end to a discharge outlet of the vessel and which provide some degree of agitation of the material during the cooking process. In apparatus of the above type, the primary heat source is the jacketed enclosure. As a consequence, a relatively high steam pressure is necessary to give a relatively high differential temperature between the process material and the heated wall in order to attain an acceptable coefficient of heat transfer. As a consequence, is is extremely difficult to control this manner of cooking to carry out the required degree of starch hydrolysis without the deleterious browning effect on the proteinaceous material.

In studying the precooking of grain and cereal commodities, it was found that the contact time between the material being processed and a heated surface must be only instantaneous if the browning of the commodity is to be prevented. It was further found that if such materials were processed within a cylindrical container in which a shaft having motivating members was used to propel the material from a charging to a discharging end thereof and wherein the shaft was only slightly smaller in diameter than the retaining cylinder in which it revolves, the moisture content of the material being processed could be so adjusted that the frictional drag of the shaft with its moving members resulted in the production of heat sufficient for cooking the material. By the continual rotation of the source of the cooking heat, the food material is brought into contact with the heated surface only for an instant at any one time, and the undesirable browning effect referred to is avoided.

It is, therefore, an object of this invention to provide an apparatus of the above type which produces a predetermined hydrolysis of starch materials without a deleterious browning of the proteinaceous material.

Another object of this invention is to provide such an apparatus for the cooking of food products whereby water soluble components are not removed from the material being processed.

Still another object of this invention is to provide an apparatus whereby foods and animal feeds may be continuously cooked under controlled conditions of time and temperature.

A further object of this invention is to provide an apparatus having the above characteristics wherein the materials being cooked make repeated but only instantaneous contact with the heat supply means.

Yet another object of this invention is to provide such apparatus wherein the cooked materials are appreciably reduced in bulk density.

Another object of this invention is to provide apparatus for treating feed materials to deactivate undesired enzymes without overtreating or browning of the primary components of the feed material.

Other objects of this invention and the invention itself will be clearly understood from the following specification and the accompanying drawings, in which said drawings:

FIGS. 1a and 1b comprise a single, vertical, longitudinal sectional view of the apparatus of this invention, the line A—A in each figure representing the separation line or a line common to both figures;

FIG. 2 is a transverse section taken along the line 2—2 of FIG. 1a;

FIG. 3 is a detail section of a portion of the machine modified to include valve means; and FIG. 4 is a longitudinal section of the valve means taken along the line 4—4 of FIG. 3.

Referring now to the drawings in all of which like parts are designated by like reference characters and particularly to FIGS. 1a and 1b, the apparatus of this invention comprises a vertically disposed barrel 1 suspended from a flat mounting plate 2 which is in turn supported by a tubular frame 3. The frame 3 comprises a plurality of legs 4 symmetrically positioned around the barrel 1 in radially spaced relation thereto and preferably having reinforcing members 5 connecting adjacent legs. The mounting plate 2 is bolted to a support 6 by means of bolts 7, said support 6 resting upon and being secured to the uppermost ends of the legs 4 in any suitable manner.

Above the mounting plate 2, there is provided an upwardly directed feed chute 8 which is coaxial with the barrel 1 and is surmounted by a drive mechanism which comprises a motor M and suitable gearing housed in a gear casing G. The feed chute 8 constitutes an extension of the barrel 1 and is provided with a laterally, obliquely upwardly directed charging chute 9.

The barrel 1 houses a rotatable worm conveyor and pressure applying member 10 which extends throughout the length of said barrel and projects upwardly through the feed chute 8 to a point above the intersection of the inlet portion 9 with said feed chute, said worm conveyor being rotatively driven by the drive mechanism.

It will be understood that, in general, the operation of the apparatus comprises rotation of the worm conveyor 10 by the motor M which is connected to said worm conveyor through suitable gearing (not shown) contained in the gear casing G. Food material for processing is introduced into the charging chute 9 from which it is fed by gravity into the feed chute 8. By rotation of the worm conveyor 10, the material is moved downwardly through the barrel 1 and is ejected from such barrel at its lowermost or discharging end.

The barrel 1 comprises an elongated tubular member having a circumferentially continuous, radiating flange 20 at the uppermost end thereof, and a similarly formed flange 21 at the lowermost end thereof. The upper flange 20 is suitably apertured to receive bolts 22 which project upwardly through said flange and are thread fitted into the mounting plate 2 to provide the securing means whereby the barrel 1 is suspended from the mounting plate 2.

The barrel 1 is also provided with longitudinally aligned and interspaced apertures 23 adapted to receive threaded breaker screws 24. The breaker screws 24 are disposed longitudinally in straight lines along the barrel 1 at diametrically opposite positions on said barrel. Each breaker screw comprises an enlarged head 24a, a relatively diametrically reduced, threaded portion 24b, and a longitudinally extending, further diametrically reduced nonthreaded portion 24c. Each breaker screw 24 is thread fitted within its respective aperture 23 whereby its head 24a is substantially flush with the outer peripheral surface of the barrel 1, and wherein the nonthreaded portion 24c extends slightly inwardly beyond the inner peripheral surface of said barrel.

The lower flange 21 of the barrel 1 is provided with a laterally projecting clevis 25 to which a barrel cover 26 is hingedly connected by means of a pivot pin or shaft 25a. The cover 26 is centrally apertured at 26a and so hinged to the lower flange 21 as to pivot into a covering position over the lowermost end of barrel 1 with the said aperture 26a being thereby axially aligned with the barrel 21. The aperture 26a is substantially of the same diametric dimension as the inner periphery of the barrel 1, and is outwardly offset at 26b adjacent its upper surface as shown in FIG. 1a. The offset portion 26b provides an upwardly open recess adapted to receive aperture restricting means such as a die 27 having die openings 28 therein. A sealing ring 29 is mounted within a suitable recess 21a of the flange 21 adjacent the inner periphery of said flange and is adapted to seal the die 27 against the lowermost end of the barrel 1 when the barrel cover 26 is in its closed position.

The lowermost end of the barrel 1 and the parts associated therewith are preferably reinforced against lateral movement by means of brace members 30 secured at one end thereof to the legs 4 and at the other end thereof to the lower flange 21 in any suitable manner.

Immediately below the lower end of the barrel 1 and the die 27, there is provided a conveyor mechanism C adapted to collect and convey the extruded and processed food material away from the apparatus of the present invention for the purpose of further operations such as the packaging thereof.

The mounting plate 2 is apertured at 2a coaxially with the barrel 1 and the feed chute 8 to provide a continuous vertical passage for the worm conveyor 10. The feed chute 8, which is positioned above said mounting plate, is provided with threaded apertures 49 adapted to receive breaker screws 40 similar in construction to the breaker screws 24 of the barrel 1, said screws 40 having threaded portions 40b and nonthreaded portions 40c. Intermediate the ends of said feed chute there is provided a housing 41 in which is rotatably mounted a star wheel 42. Said star wheel rotates upon a shaft 43 journalled in said housing and comprises a disc having circumferentially evenly interspaced lobes 44, said lobes adapted to intermesh with the worm conveyor 10 in a manner to be herein later fully described.

The uppermost end of the feed chute 8 has a circumferentially continuous, radiating flange 45 by which it is bolted to the gear casing G by means of bolts 45a. The charging chute 9 of said feed chute is secured thereto in any suitable manner such as by small bolts 46. The charging chute 9 interconnects the feed chute 8 at an opening 8a in the side of said chute and is provided with an interconnecting fluid conduit 47 having interposed therein a control valve 48.

Referring now more particularly to FIG. 1b the worm conveyor 10 comprises a cylindrical shaft 60, the upper end of which is solidly connected by means of a coupling 61 to a downwardly directed drive shaft 11 projecting from the gear casing G. A plurality of worm sections or screw flights 62 are telescope over the shaft 60 in stacked relationship throughout the length of said shaft, said worm sections being maintained thereon by means of a retainer nut 63 at the lowermost end of said shaft 60 (FIG. 1a). Adjacent the uppermost end of said shaft immediately below the coupling 61, there are provided a pair of relatively longer worm sections indicated at 62a and 62b having interposed therebetween a ring 64. The ring 64 is provided with a radially outwardly projecting breaker pin 65 which is so positioned that upon rotation of the worm conveyor 10, said breaker pin passes sequentially between the lobes 44 of the rotating star wheel 42 to remove food material which may tend to cake and accumulate therebetween.

Each worm section 62 comprises a sleeve or hub 66 adapted to slidably telescope over the shaft 60. The outer periphery of each sleeve is provided with a generally similar worm flight 67 which extends longitudinally from the lowermost edge of the respective sleeve 66 upwardly to a point substantially below the uppermost edge of said sleeve. The worm sections 62a and 62b are slightly modified whereby the worm flights thereon, indicated at 67a and 67b respectively, extend the full length of the respective sleeves 66a and 66b. The nonthreaded portions 24c and 40c of the breaker screws 24 and 40 respectively project inwardly from the inner peripheral surfaces of the barrel 1 and the feed chute 8 at levels between the vertically interspaced worm flights 67, just clearing the outer peripheral surfaces of the sleeves 66 adjacent their inner ends. All of the worm sections are prevented from rotating relative to the shaft 60 by means of a key bar 68 which interfits complementary grooves 60' and 62' respectively of the shaft 60 and the sleeves 66 (FIG. 2).

The worm sections 62a and 62b are positioned generally in the area of the intersecting inlet portion 9, and the helical pitch of the worm flight 67a and 67b are such as to feed the incoming food material downwardly through the feed chute 8 toward the barrel 1. The outer diameter of all of the worm flights is such that they closely interfit the inner peripheral surfaces of the feed chute 8 and the barrel 1.

The barrel 1 is provided at the outer periphery thereof with a pair of longitudinally interspaced, circumferentially continuous, fluid tight jackets 70 and 71. The relatively uppermost jacket 70 is connected to an incoming line 72 and an outgoing line 73, said lines having valves 72a and 73a interposed therein respectively. In like manner, the lower jacket 71 is provided with an incoming line 74 having a valve 74a and an outgoing line 75 having a valve 75a. A single jacket could be adapted to serve the desired purpose, or any convenient plurality of jackets over all or any part of the barrel.

The jackets 70 and 71 are adapted to hold steam, water, or similar fluid which may be circulated therethrough by means of the incoming lines 72—74 and the exhaust lines 73—75. The amount of fluid which flows through the jacket is controlled by the valves 72a—74a and 73a—75a, and by means of said valves the jackets may be deactivated all together if so desired.

Generally, in the operation of the apparatus of this device, the grain or similar raw food product is introduced through the charging chute 9 into the feed chute 8 either in a dry state or with the admixture of water or other liquid through the conduit 47. The food material entering the feed chute 8 is forced to move downwardly due to the blocking action of the star wheel 42 which intermeshes with the worm flight 67b and is rotatably driven thereby. The lobes 44 are rotatably successively interposed between adjacent helical turns of the worm flight 67b to provide an abutment which prevents rotation of the newly introduced material with the worm thereby compelling said material to move downwardly through the feed chute 8. As the material moves along, it is continually churned and broken by the inwardly directed breaker screws 24 which also tend to prevent rotation of the material with the worm shaft 10 thereby causing it to be constantly propelled in a downward direction toward the die 27.

Referring now to the modification of FIGS. 3 and 4, one or more of the breaker screws may be replaced by a steam injection valve 80. The valve 80 comprises a housing 81 having a reduced, threaded portion 82 adapted to interfit one of the threaded apertures 23, adjacent the uppermost end of the barrel 1 preferably in the upper 1/3 or 1/4 of said barrel. The housing 81 also has a nonthreaded portion 83 which extends inwardly beyond the inner periphery of either the barrel or feed chute in the manner of the nonthreaded portions 24c—40c of breaker screws 24—40.

The housing 81 is hollow and is provided at the outwardly directed end thereof with a thread fitted cap 84. A valve stem 85 is mounted concentrically within the housing 81, said stem having an intermediate threaded portion 86 thread fitted within a bore 87 of said housing. The valve stem projects outwardly from the threaded portion 86 through a suitable aperture in the cap 84 and is provided at its outermost end with a handle 88. Packing 89 is compressed under the cap 84 whereby the stem 85 is sealed in relation to the bore 87.

The valve stem 85 is diametrically reduced at its inwardly directed portion and is provided at the end thereof with a frusto-conical valve closure member 90 which has a complementary interfit with a frusto-conical valve seat 91. A small, cylindrical plunger 92 extends coaxially inwardly from the valve closure member 90 and closely interfits a small, cylindrical bore 93 in the innermost end of the housing 81. The interfit between the small piston 92 and the bore 93 is preferably such that when the valve closure 90 is unseated by turning the handle 88, pressurized steam may be forced by the piston 92 to enter into the barrel 1 or the feed chute 8 but whereby the food material being processed cannot easily enter the housing 81.

The cooking heat in the present apparatus is provided selectively in any combination from three sources: the steam jackets 70 and 71, the worm conveyor 10, or the steam injection valve 80.

The steam jackets 70 and 71 may be used to provide cooking heat to the barrel 1 by maintaining said jacket with the desired steam pressure. Said jackets may also be used alternatively as cooling means, and this applies particularly to the lower steam jacket 71. For example, it may be desired to heat the barrel 1 in the uppermost region thereof by means of a steam jacket 70 to aid in cooking the food material shortly after it enters said barrel and then, subsequently, to chill or cool the same as it passes through the lower portion of the barrel in the region of jacket 71. In this case the latter jacket would be provided with a chilling liquid circulated therethrough to cool the barrel 1.

Heat is produced in the worm conveyor 10 by the frictional drag of the food material upon the conveyor. The distance between the outer periphery of the sleeve 66 and the inner periphery of the barrel 1 is preferably relatively small, and as a result of the rotation of the worm conveyor 10 and the worm flight 67 through the material being processed, some of the energy employed to rotate the worm conveyor is converted into heat energy. By adjusting the moisture content of the specific material being processed, the heat generated by said worm conveyor may be either a portion of the heat required to attain the predetermined degree of cooking or it may be such as to provide all of the heat necessary. As a consequence, moisture contents of different materials may be selected whereby, for example, 60-90 percent of the heat requirement is supplied by the worm conveyor and the remaining 10-40 percent of the heat is supplied by the steam jacket 70—71. As a result of this, relatively low differential temperatures are needed between the barrel 1 and the material being processed to furnish the slight additional amount of heat which, added to that of the worm conveyor, meets the requirements for cooking.

As hereinbefore stated, one or more of the valves 80 may be used in place of one or more of the breaker screws 24. The valve is so designed that when it is in the closed position with the closure member 90 abutting the valve seat 91, no process material from within the barrel 1 can back up into the valve system. By maintaining a constant steam pressure on the valve 80 which is higher than the mechanically induced steam pressure within the barrel, no process material can enter the valve even when said valve is in an open position.

The valve 80 is used to introduce live steam into the mass of material, preferably adjacent the upper 1/3 or 1/4 of the barrel 1. The live steam gives up its latent heat and causes a rapid increase in the temperature of the material being processed. This increase in temperature occurs only through instantaneous contact between the solid material and the heating medium since the heating medium is in vapor form. Additionally, moisture is added to the processed material by condensation of the steam as it gives off its latent heat.

The steam injection may be used as an alternative supplementary form of heat in the place of the steam jackets 70 and 71. A primary advantage of the use of steam injections is that it may be used to so adjust the moisture content of the food material as to attain an optimal frictional drag between the worm conveyor 10 and the material to cause said worm conveyor to become heated.

The rate of rotation of the worm conveyor 10 is such that the peripheral velocity of said conveyor varies within a range of approximately 200-5000 feet per minute relative to the theoretical velocity of the material being conveyed through the apparatus. The heat which is being supplied to the material by the conversion of the driving power into heat energy in the conveyor is transmitted to the material being processed at relatively high differential speed. The heat transfer coefficient in such a system is high and, equally important, the contact time between any one particle of processed material and the shaft is only instantaneous.

In view of the above, it will be readily seen that a wide range of control for processing a variety of material is available with the apparatus of this invention. In certain instances, steam injection alone may be used as the primary source of heat. The apparatus would not, under these circumstances, require the jacketing means of 70—71. In other instances, live steam introduced through the valve 80 and heat from the upper jacket 70 may be employed in combination to carry out a cooking operation which is subsequently followed by a cooling off process in the lower portions of the barrel 1 by the circulation of water, chilled brine, or other fluid in the relatively lower jacket 71. The moisture content of the material being processed may be alternatively adjusted by the use of steam injections through a valve 80 or by introducing moisture directly into the incoming material through the conduit 47 or by a combination of the two. The breaker screws 24 which furnish obstructions to the rotation of the material also serve the function of mixing rods thereby thoroughly and uniformly distributing the moisture content as the material is violently agitated while under mechanical compression.

The die openings 28 are of such size and present such resistance to the extrusion of the processed material that internal steam pressure is attained within the material as it passes downwardly through the barrel. The worm flights 67 impose mechanical pressures upon the material which are greater than the steam pressure developed within the material, and as a result the material being processed is continually carried downwardly through the barrel 1 regardless of the steam pressure developed within the material. When the cooked material issues from the barrel through the die openings 28, the steam pressure which has developed within the material immediately expands to atmospheric pressure thereby expanding the physical structure of the food product itself. The result is a low bulk density of the product which permits the ready reduction of the moisture content of the product to any desired level.

Although the moisture content required to permit the operation of the apparatus of this invention in its prescribed manner may range from 12 to 35 percent with different commodities, the preferred range is from approximately 16-32 percent. The exact limit of the moisture in any event is less than that required to make a slurry of the solid materials in water. The retention time within the apparatus may vary from 15 to 240 seconds at temperatures ranging between 212 and 300 degrees Fahrenheit. It is, therefore, readily understood that the specific time, moisture content, temperature and, therefore, internal pressure will vary with the specific commodity being processed and the particular cooking requirements for a given commodity.

The following are descriptions of experiments carried out with the apparatus of this invention which serve to disclose the wide versatility and usefulness of the invention.

In one instance, whole, unprocessed soybeans were cracked into approximately ⅛ inch particle size. These particles were then rolled into flakes of .008 to .010 inch in thickness. The comminuted material was then conveyed to the apparatus of this invention at the rate of 100 pounds per hour at a moisture content of 10 percent. Sufficient additional moisture was metered to the feet inlet of the apparatus by the conduit 47 so that the result in moisture content of the soybean material entering the feed chute 8 was 21 percent. Thirty-five pounds per square inch steam pressure was admitted to the steam jackets 70—71 surrounding the barrel. Under these conditions of operations, the precooked soybean material issuing from the die openings 28 at the discharge end of the barrel contained 16 percent moisture. Upon analysis no enzyme urease was found in the product and yet the color of the product was substantially the same yellow color of the original comminuted soybeans.

In another instance, a dry dog feed mixture consisting of approximately fifty percent starch in the form of cereal grains with soybean meal, rendered cracklings and other feed additives were ground and processed in the apparatus of this invention. The dog food material was fed at a rate of 1400 pounds an hour, and sufficient water was metered at the inlet portion 9 by means of the conduit 45 to adjust the total moisture content of the material to 28 percent. The steam pressure in the jackets 70—71 were adjusted to 22 pounds per square inch. The feed material entering the apparatus had a bulk density of approximately 45 pounds per cubic foot, but the cooked dog food mixture which issued from the die openings 28, upon being dried to a moisture content of 11 percent, had a bulk density of approximately 21 pounds per cubic foot. Laboratory analysis indicated that the starch of the grain in the original feed material had been hydrolyzed to the extent that the starch cells were ruptured and yet there was no deleterious browning of the product.

In another experiment, whole corn was ground in a hammer mill to a coarse flour texture and then conveyed to the apparatus with the addition of sufficient water to give a total moisture content of 24 percent. The jackets 70—71 were maintained at 35 pounds per square inch steam pressure, and a product issued from the die openings 28 at a moisture content of 19 percent and with a bulk density of 5 pounds per cubic foot. This bulk density is in contrast to the approximately 60 pounds per cubic foot of the common grains. The resulting product had a pleasing taste and a structure that was suitable for human consumption. It was found that cheese, sugar and salt or other additives could be added to the corn or other grains to give several types of nutritional products for human foods. Wheat, rice, oats and other starch commodities have been subjected to the above process, and upon grinding they may be converted to a palatable gruel, porridge, or cooked cereal by the addition of boiling water.

A dry dog food mixture similar to that given in the second example and consisting of approximately fifty percent starch in the form of cereal grains with soybean meal, rendered cracklings, and other feed additives was ground and processed with slight variations over the process used above. The raw material was fed at a rate of approximately 1800 pounds per hour to a machine of the type herein disclosed and illustrated but wherein the steam jackets 70—71 were not employed. Live steam was admitted to the apparatus through two valves 80 as shown in FIGS. 3 and 4 which were located adjacent the upper part of the device. Sufficient steam was employed to bring the moisture content of the material up to approximately 22 percent. An additional amount of water equivalent to approximately 20 percent of the total requirements was added to the raw material just as it entered the feed opening or at the inlet portion 9. After cooling, the product from this experiment indicated that substantially all of the starch cells had been ruptured so that a sufficient degree of starch hydrolysis had taken place. It was further found that by using the live steam, the horsepower requirements for driving the worm conveyor 10 decreased to approximately one third of that required in the above referred to second example.

In an experiment attempting to determine the value of the present invention to those concerned with the problems of feeding and raising animals, a creep feed was processed in the apparatus of this invention. It was then ground to the particle size similar to that of the original creep feed mixture. One group of piglets was fed the processed creep feed and a control group was fed unprocessed creep feed. The data from this test indicated that the piglets in the experimental group consumed 1.97 times the amount of feed consumed by those in the control group.

From the above examples of the apparatus as herein disclosed and illustrated, it is apparent that the device of the present invention may be used to precook food products under closely controlled conditions covering a wide variety of raw materials and end products. The effect attained by the methods of this apparatus, with the violent agitation of the material under mechanical compression, is quite different than that obtained with the agitation obtained in a jacketed vessel of conventional design wherein material is more or less loosely conveyed through the vessel. Because of the mechanical compression in the present device, the proper retention time curve has a steeper slope and is less broad at the top than the retention time curve for a vessel wherein the solids are not compacted. As a consequence, the retention time within the apparatus of this invention is more specific and permits shorter processing times than possible with conventional cooking equipment known to the art.

It will also be understood that departures from the details of this invention may be made without, however, departing from the spirit thereof or the scope of the appended claims.

What is claimed is:

1. Apparatus for the precooking of food compounds comprising an elongated barrel having a charging end and a discharging end, a worm conveyor having a plurality of worm flights rotatably mounted within said barrel adapted to propel unprocessed food material from said charging to said discharging end, breaker means projecting into said barrel between at least some of adjacent pairs of said worm flights inhibiting the rotation of said food material, certain of said breaker means comprising valves, each valve optionally injecting steam into said barrel for heating and moisturizing said food material, a die covering said discharging end having die openings therein for the extrusion of said food material and providing resistance to the movement of said food material through said barrel, said food material being of such viscosity as to cause a frictional drag upon the worm conveyor which causes said worm conveyor to heat, the combined heat of said injected steam and said worm conveyor being such as to cook said food material prior to the extrusion thereof through said die openings.

2. Apparatus for the preparation of food compounds comprising a barrel having charging and discharging ends, a worm conveyor mounted within said barrel and during rotation forcefully propelling food material through said barrel from said charging to said discharging end, an extrusion die covering said discharging end of said barrel having die openings therein, means feeding unprocessed food material into said charging end in use of the apparatus, means rotating said worm conveyor, said worm conveyor having axially spaced worm flights, means defining mounting apertures through the wall of said barrel between adjacent of said worm flights, breaker means removably mounted in said apertures and having portions thereof projecting into said barrel and inhibiting the rotation of said food material, said food material being of such viscosity in relation to the rotative speed of said worm conveyor that the frictional drag of said food material on said worm conveyor causes said worm conveyor to heat sufficiently to provide the heat necessary to cook said food material as it passes through said barrel, said food material being continuously extruded through said die openings during rotation of said worm conveyor, certain of said breaker means comprising valves, and each valve optionally injecting steam into said barrel for heating said unprocessed food material and condensing within said barrel and adding a predetermined amount of moisture to said material.

3. Apparatus as set forth in claim 2 wherein the recited mounting apertures are all of uniform shape and dimension, and wherein the recited breaker means including the valves are of such dimension and form as to be interchangeably mountable within said mounting apertures.

4. Apparatus as set forth in claim 3 wherein the recited mounting apertures are internally threaded and wherein the recited breaker means and valves are each provided with a threaded portion for mounting within said mounting apertures.

5. An apparatus for the precooking of various food compounds of the type containing complex carbohydrates and adapted for a wide range of control of moisture content and cooking temperature, said apparatus comprising an elongated, tubular barrel having a charging end and a discharging end, a closely interfitting worm conveyor rotatively mounted within said barrel for conveying food material from said charging to said discharging end, an extrusion die covering said discharging end having die openings therein, means for adding liquid to said food material prior to its introduction into said charging end, said worm conveyor having axially spaced worm flights, means defining mounting apertures through the wall of said barrel between adjacent of said worm flights, breaker means mounted in said apertures and having portions thereof projecting into said barrel inhibiting the rotation of said food material and causing violent agitation thereof, the speed of rotation of said worm conveyor being such that it becomes heated from the frictional drag of the food material, a fluid-tight jacket surrounding a portion of said barrel and receiving fluid for controlling the temperature of said barrel, separate adjustment means for relatively varying the amount of liquid introduced into said food material and the fluid of said jacket to provide the optimum cooking conditions for a predetermined food material, certain of said breaker means comprising valves, each valve optionally injecting steam into said barrel for heating said unprocessed food material and condensing within said barrel and adding a predetermined amount of moisture to said material, and adjustment means for varying the amount of steam introduced through said valves.

6. Apparatus as set forth in claim 5 wherein the recited mounting apertures are all of uniform shape and dimension, and wherein the recited breaker means and valves are of such dimension and form as to be interchangeably mountable within said mounting apertures.

7. Apparatus as set forth in claim 6 wherein the recited mounting apertures are internally threaded and wherein the recited breaker means and valves are each provided with a threaded portion for mounting within said mounting apertures.

References Cited in the file of this patent

UNITED STATES PATENTS

| 395,893 | Gent | Jan. 8, 1889 |
|---|---|---|
| 1,696,401 | Hiller | Dec. 25, 1928 |
| 1,725,171 | Anderson | Aug. 20, 1929 |
| 1,848,236 | Anderson | Mar. 8, 1932 |
| 1,922,313 | Mason | Aug. 15, 1933 |
| 1,924,827 | Anderson | Aug. 29, 1933 |
| 2,060,408 | Wood | Nov. 10, 1936 |
| 2,120,138 | Mathews et al. | June 7, 1938 |
| 2,295,868 | Schwebke et al. | Sept. 15, 1942 |
| 2,489,267 | Chapin | Nov. 29, 1949 |
| 2,505,125 | List | Apr. 25, 1950 |
| 2,705,927 | Graves et al. | Apr. 12, 1955 |
| 2,802,430 | Filler | Aug. 13, 1957 |
| 2,915,957 | Bowman | Dec. 8, 1959 |

FOREIGN PATENTS

| 137,813 | Germany | Jan. 27, 1903 |